United States Patent
Masuda et al.

(10) Patent No.: US 6,496,214 B1
(45) Date of Patent: Dec. 17, 2002

(54) IMAGE FORMING ELEMENTS ARRAY, AND OPTICAL PRINTING HEAD AND IMAGE FORMING APPARATUS USING THE ARRAY

(75) Inventors: Koji Masuda, Kanagawa (JP); Hiroshi Koizumi, Kanagawa (JP)

(73) Assignee: Ricoh Technology Research Inc., Kanagawa (JP)

( * ) Notice: Subject to any disclaimer, the term of this patent is extended or adjusted under 35 U.S.C. 154(b) by 0 days.

(21) Appl. No.: 09/507,516

(22) Filed: Feb. 18, 2000

(30) Foreign Application Priority Data

Feb. 19, 1999 (JP) .......................... 11-040821
Mar. 3, 1999 (JP) .......................... 11-055214

(51) Int. Cl.⁷ .......................... B41J 27/00; G02B 27/10
(52) U.S. Cl. .................... 347/244; 347/258; 359/626
(58) Field of Search ................. 347/241, 244, 347/256, 258; 359/205, 619, 654, 625, 626

(56) References Cited

U.S. PATENT DOCUMENTS

| | | | | |
|---|---|---|---|---|
| 4,696,545 A | * | 9/1987 | Lama et al. ................ 359/626 |
| 5,035,486 A | * | 7/1991 | Inokuchi ..................... 359/625 |
| 5,907,438 A | * | 5/1999 | Fujita et al. ................. 359/619 |
| 6,031,668 A | * | 2/2000 | Toyama et al. ............. 359/654 |
| 6,166,842 A | * | 12/2000 | Aoki et al. .................. 359/205 |

FOREIGN PATENT DOCUMENTS

| | | | | |
|---|---|---|---|---|
| JP | 63-225218 | * | 9/1988 | ........... G02B/27/18 |
| JP | 05-232400 | | 9/1993 | |
| JP | 06-344598 | | 12/1994 | |

* cited by examiner

Primary Examiner—Hai Pham
(74) Attorney, Agent, or Firm—Eugene C. Rzucidlo; Greenberg Traurig LLP

(57) ABSTRACT

An image forming elements array includes a plurality of image forming elements which are integrated with each other and are arranged to extend in an arrangement direction so as to generate an image having common magnification. When the distance along the optical axis from an object plane to the incident surface of the image forming element is represented by L and the distance along the optical axis from the incident surface to the emerging surface is represented by T, a condition $0.20 \leq T/L \leq 0.50$ is satisfied.

14 Claims, 10 Drawing Sheets direction perpendicular to arrangement direction arrangement pitch spherical aberration (mm)

IMAGE FORMING ELEMENTS ARRAY, AND OPTICAL PRINTING HEAD AND IMAGE FORMING APPARATUS USING THE ARRAY

FIELD OF THE INVENTION

The present invention relates to an image forming elements array for use in a digital image writing optical system of image forming apparatuses such as digital copying machines, printers and facsimile machines, and an optical printing head and an image forming apparatus using the image forming elements array.

DISCUSSION OF THE BACKGROUND

Recently, because image forming apparatuses such as digital copying machines, printers and facsimile machines must be smaller, digital image writing apparatuses included in such image forming apparatuses must also be smaller. Generally, digital image writing systems are classified into two types: (1) an optical scanning system which scans a light flux emitted from a light source such as a semiconductor laser by deflecting the light flux with a deflector and form the deflected light flux into an optical spot with a scanning image forming lens; and (2) a solid scanning system which forms a light flux emitted from a light emitting elements array such as an LED array into an optical beam spot with an image forming elements array.

The optical scanning system requires a relatively long light path due to the use of an optical deflector to deflect a light flux from a light source so as to scan a scanned surface. Therefore, the size of an apparatus using a digital image writing apparatus including the optical scanning system is relatively large. On the other hand, the solid scanning system can make a light path relatively short, and thereby an apparatus using a digital image writing apparatus including the solid scanning system can be made relatively small. Further, the digital scanning system has advantage in that mechanical devices that have to be driven, such as an optical deflector, are not required.

Japanese Patent Laid-open Publication No. 10-153751 describes an example of such digital image writing apparatuses using a solid scanning system. As illustrated in FIG. 1(A), an image forming elements array 90 included in the digital image writing apparatus includes a plurality of image forming elements which are arranged in an arrangement direction. Each image forming element has an incident surface 90a at the incident side, i.e., the light emitting elements array side, an emerging surface 90b at the emerging side, i.e., the scanned surface side, and a pair of reflective surfaces 90c, which are formed integrated with each other. The pair of reflective surfaces 90c are arranged at right angles relative to each other so as to define a roof-prism. The reflective surfaces 90c do not affect an imaging function and are slanted 45 degrees relative to the incident light axis.

A light flux emitted from a point of the surface of a light emitting element is transmitted to the incident surface 90a of the image forming elements array 90, is sequentially reflected by the pair of reflective surfaces 90c and then emerges from the emerging surface 90b to reach a scanned surface of a photoconductor. The incident light axis and the emerging light axis are substantially at right angles to each other. An image at the point of the light emitting element surface is formed by the image forming function of the incident surface 90a and the emerging surface 90b at a corresponding point of the scanned surface of the photoconductor.

The image forming elements array 90 further includes, as illustrated in FIG. 1(B), an aperture member 91 having a plurality openings 91a for optimizing the light quantity and for preventing cross talk between the adjacent image forming elements. The aperture member 91 has a plate-like shape having an L-shaped configuration in the cross-section, and as illustrated in FIG. 1(C) the openings 91a are provided in both parts of the L-shaped plate at equal intervals in the direction in which the image forming elements are arranged so as to correspond to the incident surface 90a and the emerging surface 90b of each image forming element.

The aperture member 91 having an L-shaped plate configuration in the cross-section as described above shields a relatively large part of the light flux emitted from the light emitting elements array 90, and as a result the transmission efficiency of the image forming elements array 90 is significantly decreased. Particularly, when the thickness of the aperture member 91 is about one n-th of the arrangement pitch of the image forming elements, or the diameter of the openings 91a of the aperture member 91 is smaller relative to the arrangement pitch of the image forming elements, the decrease of the transmission efficiency is remarkable.

The image forming elements array 90 is generally used as an imaging device to form an image of an original document, that is placed on an object plane, on a scanned surface of a photoconductor or surfaces of light receiving elements of a light receiving elements array. In order to form an high quality image of an original document on a scanned surface of a photoconductor, the scanned surface of the photoconductor is required to be appropriately lighted by the light flux reflected from the surface of the original document carrying information of the image. Therefore, when an aperture member is used with an image forming elements array for optimizing the light quantity and for preventing cross talk between the adjacent image forming elements of the image forming elements array, it is important to configure the aperture member so as not to decrease the transmission efficiency of the image forming elements array so that an appropriate quantity of light is maintained.

On the other hand, a light emitting elements array for use in a solid scanning system for a higher resolution, such as 600 dpi or higher, for example, can increase the quantity of an emitting light by increasing the inputting current to the light emitting elements array. However, an excessive inputting current over the limit may damage the light emitting element itself, and further, even when an increased inputting current does not exceed the limit, increase of a current causes increase of emitted heat and power consumption. Therefore, increasing the quantity of an emitting light of a light emitting elements array by increasing the inputting current has some limitation. Accordingly, it is desired that an image forming elements array effectively utilizes a light quantity allowed for a light emitting element of the image forming elements array so as not to decrease the transmission efficiency of the image forming elements array. When the aperture member 91 as described above is used, it is necessary to increase the diameter of the openings 91a of the aperture member 91 and at the same time to reduce the thickness of the aperture member 91 as much as possible. It may be ideal if the aperture member 91 can be eliminated, but, without the aperture member 91, the image forming performance of an image forming elements array may be decreased and as a result, optical beam spots having a good circularity can not be formed reliably.

Further, a solid scanning system using an image forming elements array has a disadvantage in that it is difficult to obtain uniform density in a half-tone image. It has been known that non-uniform density in a half-tone image is caused periodically according to the arrangement pitch of image forming elements of the image forming elements array. A human being is most sensible to non-uniform density occurring in a low frequency area, for example, at about 0.2 to about 1 cycle/mm. The arrangement pitch of image forming elements corresponding to the low frequency cycle of about 0.2 to about 1 cycle/mm is about 1 mm to about 5 mm. Therefore, the arrangement pitch for image forming elements is desired to be made shorter than about 1 mm so that the above low frequency area is avoid.

The image forming elements array used in such a solid scanning system is classified into three types, a lens array having distributed refractive index, a lens array as described for example in Japanese Patent Laid-open Publication No. 6-344598 and an in-prism lens array or a roof-mirror lens array as described for example in Japanese Patent Laid-open Publication No. 5-232400.

A lens array with distributed refractive index is constructed by bundling lenses having distributed refractive index respectively and joining them together using adhesive or other suitable material. Therefore, the optical axis of each lens tends to deviate from that of the other lenses and thereby, the focal point tends to be varied.

A lens array as described for example in Japanese Patent Laid-open Publication No. 6-344598 is not configured as an image erecting system in a direction in which lenses are arranged. Therefore, a shielding mechanism is required for each lens and as a result the optical transmission efficiency is decreased and the light quantity distribution is not uniform.

An in-prism lens array as described for example in Japanese Patent Laid-open Publication No. 5-232400 has a spherical surface and therefore, an optical performance required in an image writing device cannot be obtained. Particularly, the beam spot diameter tends to largely fluctuate.

The applicant of the present application has proposed in Japanese Patent Application No. 10-282295 to provide an image forming elements array that reliably forms an optical beam spot having a relatively small diameter and that has an optical performance required in an image writing device by arranging the image forming elements along a line in an arrangement direction and integrating a plurality of image forming elements having an incident surface, an emerging surface and a pair of reflective surfaces, with the incident surface and the emerging surface having a non-spherical shape.

A solid scanning system using a light emitting elements array and an image forming elements array as described above has been also known to have a disadvantage in that image density is not uniform and white vertical stripes partially appear in a solid black image. It has been confirmed by the applicant that such non-uniformity in the image density in a solid black image is caused by variation of the performance of light emitting elements of the light emitting elements array and/or image forming elements of the image forming elements array.

Further, as described above, the solid scanning system has a disadvantage in that it is difficult to obtain uniform density in a half-tone image, and it has been known that non-uniform density in a half-tone image is caused periodically according to an arrangement pitch of the image forming elements. As also described above, human beings are most sensible to non-uniform density occurring when the arrangement pitch of image forming elements is about 1 mm to about 5 mm (corresponding to the low frequency cycle of about 0.2 to about 1 cycle/mm).

The applicant of the present application has therefore proposed in Japanese Patent Application No. 10-287460 an image forming elements array that reduces non-uniformity in image density occurring partially or periodically by making the arrangement pitch of image forming elements constructing an image forming elements array shorter than about 1 mm.

SUMMARY OF THE INVENTION

In order to overcome the problems described above, preferred embodiments of the present invention provide an image forming element array, and an optical printing head and an image forming apparatus including the image forming element array, in which the optical transmission efficiency and the image forming performance are greatly improved and an excellent quality image is produced.

The preferred embodiments further provide an image forming elements array, and an optical printing head and an image forming apparatus using the image forming elements array, in which non-uniformity in the image density is minimized to a level that is not detectable by human beings and thereby, excellent image quality is obtained.

Other preferred embodiments of the present invention provide an image forming elements array, an optical printing head and an image forming apparatus using the array, in which the processing and the mass-production properties are greatly improved.

According to a preferred embodiment of the present invention, an image forming elements array includes a plurality of image forming elements which are arranged in an arrangement direction and integral with each other so as to generate an erected image in the arrangement direction with a common magnification. When the distance along the optical axis from an object plane to an incident surface of the image forming element is represented by L and the distance along the optical axis from the incident surface to the emerging surface is represented by T, a condition $0.20 \leq T/L \leq 0.50$ is satisfied.

According to another preferred embodiment of the present invention, an image forming elements array includes a plurality of image forming elements which are arranged in an arrangement direction and integral with each other so as to generate an erected image in the arrangement direction with a common magnification. When the distance along the optical axis from the incident surface to the emerging surface is represented by T, and the arrangement pitch of the image forming elements is represented by P, a condition $0.16 \leq P/T \leq 0.50$ is satisfied.

According to another preferred embodiment of the present invention, the arrangement pitch P of the image forming elements is preferably less than about 1 mm. Further, the incident surface and the emerging surface may be non-spherical.

According to another preferred embodiment of the present invention, an optical printing head for forming an optical spot on a scanned surface includes an image forming array having a plurality of image forming elements which are arranged in an arrangement direction and are integral with each other so as to generate an erected image in the arrangement direction with a common magnification. When the distance along an optical axis from an object plane to an incident surface of the image forming element is represented by L and the distance along the optical axis from the incident surface to an emerging surface of the image forming element is represented by T, a condition $0.20 \leq T/L \leq 0.50$ is satisfied. The optical printing head further includes a light emitting elements array including a plurality of light emitting elements. The image forming elements array is constructed to generate a light flux from each of the plurality of light emitting elements into the optical beam spot on the scanned surface.

According to another preferred embodiment of the present invention, an image forming apparatus includes a scanned surface and an optical printing head for forming an optical beam spot on the scanned surface. The optical printing head includes an image forming array having a plurality of image forming elements which are arranged in an arrangement direction and integral with each other so as to generate an erected image in the arrangement direction with a common magnification. When the distance along an optical axis from an object plane to an incident surface of the image forming element is represented by L and the distance along the optical axis from the incident surface to an emerging surface of the image forming element is represented by T, a condition $0.20 \leq T/L \leq 0.50$ is satisfied. The optical printing head further includes a light emitting elements array including a plurality of light emitting elements. The image forming elements array forms a light flux from each of the plurality of light emitting elements into the optical beam spot on the scanned surface.

According to another preferred embodiment of the present invention, an image forming elements array includes a plurality of equivalent image forming elements which are arranged in a direction and formed integrated with each other. Each of the plurality of image forming elements includes an incident surface positioned at the incident side, an emerging surface positioned at the emerging side and a pair of reflective surfaces to guide a light flux from the incident surface to the emerging side. The incident and emerging surfaces are respectively non-spherical and the arrangement pitch of the image forming elements is preferably less than about 1 mm.

According to another preferred embodiment of the present invention, in the immediately above image forming elements array, when H represents a lens height, R represents a paraxial radius of curvature, K represents a cone constant, and A, B, C, D represent fixed numbers, a non-spherical shape surface $X_{ASP}(H)$ satisfies a condition; $X_{ASP}(H)=H^2/[R+R\{1-(1+K)(H/R)^2\}]+AH^4+BH^6+CH^8+DH^{10}$ . . . and a spherical shape $X_{ASP}(H)$ satisfies a condition; $X_{ASP}(H)=H^2/[R+R\{1-(H/R)^2\}]$, and when a deviation amount (H) of the non-spherical shape $X_{ASP}(H)$ from the spherical shape $X_{SPH}(H)$ is represented by; $(H)=X_{ASP}(H)-X_{SPH}(H)$, the non-spherical shape $X_{ASP}(H)$ may be set such that the deviation amount (H) continuously decreases as the lens height H increases.

Further, the image forming elements array may be configured such that the incident surface and the emerging surface are formed in a substantially same non-spherical shape and each of the plurality of image forming elements forms an erected image in a same magnification in a direction in which the plurality of image forming elements are arranged, and furthermore such that an angle formed by the incident light axis and the emerging light axis is greater than 90 degree.

According to another preferred embodiment of the present invention, an optical printing head for forming an optical spot on a scanned surface includes an image forming elements array having a plurality of equivalent image forming elements which are arranged in a direction and formed integrated with each other. Each of the plurality of image forming elements includes an incident surface positioned at the incident side, an emerging surface positioned at the emerging side and a pair of reflective surfaces to guide a light flux from the incident surface to the emerging side. The incident and emerging surfaces are respectively non-spherical, and the arrangement pitch of the image forming elements is preferably less than about 1 mm. The optical printing head further includes a light emitting elements array including a plurality of light emitting elements. A light flux from each of the plurality of light emitting elements of the light emitting elements array forms the optical beam spot on the scanned surface via at least two image forming elements of the plurality of image forming elements.

According to another preferred embodiment of the present invention, the optical printing head described in the preceding paragraph may include an opening member having a plurality of openings. The opening member may be arranged between the light emitting elements array and the image forming elements array or between the image forming elements array and the scanned surface such that the plurality of openings of the opening member respectively correspond to the image forming elements of the image forming array. Further, the beam spot diameter may be smaller than the arrangement pitch of the light emitting elements.

According to another preferred embodiment of the present invention, an image forming apparatus includes a scanned surface and an optical printing head for forming an optical spot on the scanned surface. The optical printing head includes an image forming elements array having a plurality of equivalent image forming elements which are arranged in an arrangement direction and are integral with each other. Each of the plurality of image forming elements includes an incident surface positioned at the incident side, an emerging surface positioned at the emerging side and a pair of reflective surfaces to guide a light flux from the incident surface to the emerging side. The incident and emerging surfaces are respectively non-spherical, and the arrangement pitch of the image forming elements is preferably less than about 1 mm. The optical printing head further includes a light emitting elements array including a plurality of light emitting elements, and a light flux from each of the plurality of light emitting elements of the light emitting elements array forms the optical beam spot on the scanned surface via at least two image forming elements of the plurality of image forming elements.

Other features, elements and advantages of preferred embodiments of the present invention will be disclosed in the detailed description of preferred embodiments below.

BRIEF DESCRIPTION OF THE DRAWINGS

A more complete appreciation of the present invention and many of the attendant advantages thereof will be readily obtained as the same becomes better understood by reference to the following detailed description of preferred embodiments when considered in connection with the accompanying drawings, wherein.

DETAILED DESCRIPTION OF PREFERRED EMBODIMENTS

Figure 1A:
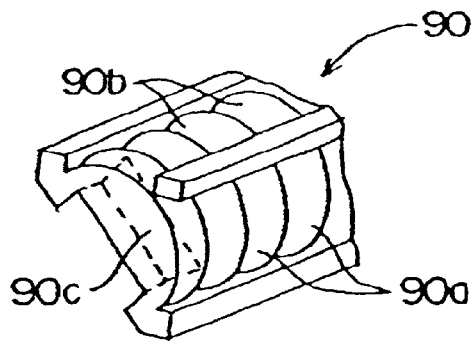
FIGS. 1(A)–1(C) are schematic drawings illustrating an example of an image forming elements array having an aperture member.
Figure 1B:
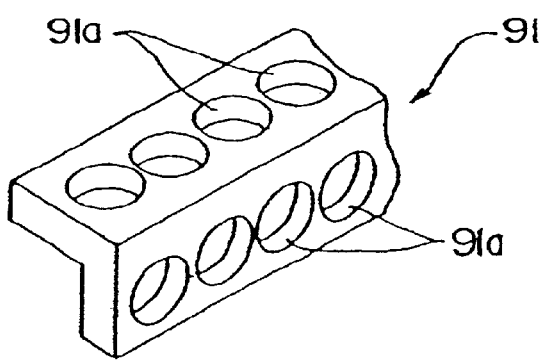
Figure 1C:
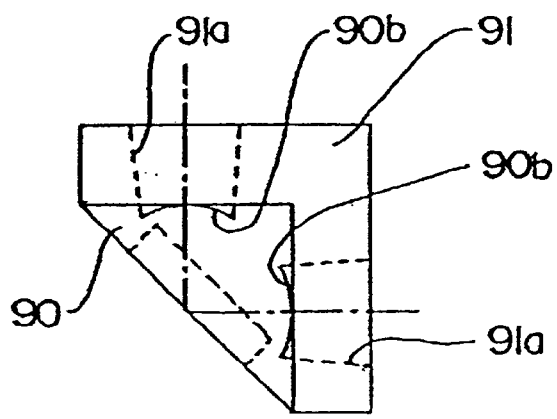

Referring now to the drawings, wherein like reference numerals designate identical or corresponding elements, preferred embodiments of the present invention are described.

Figure 2:
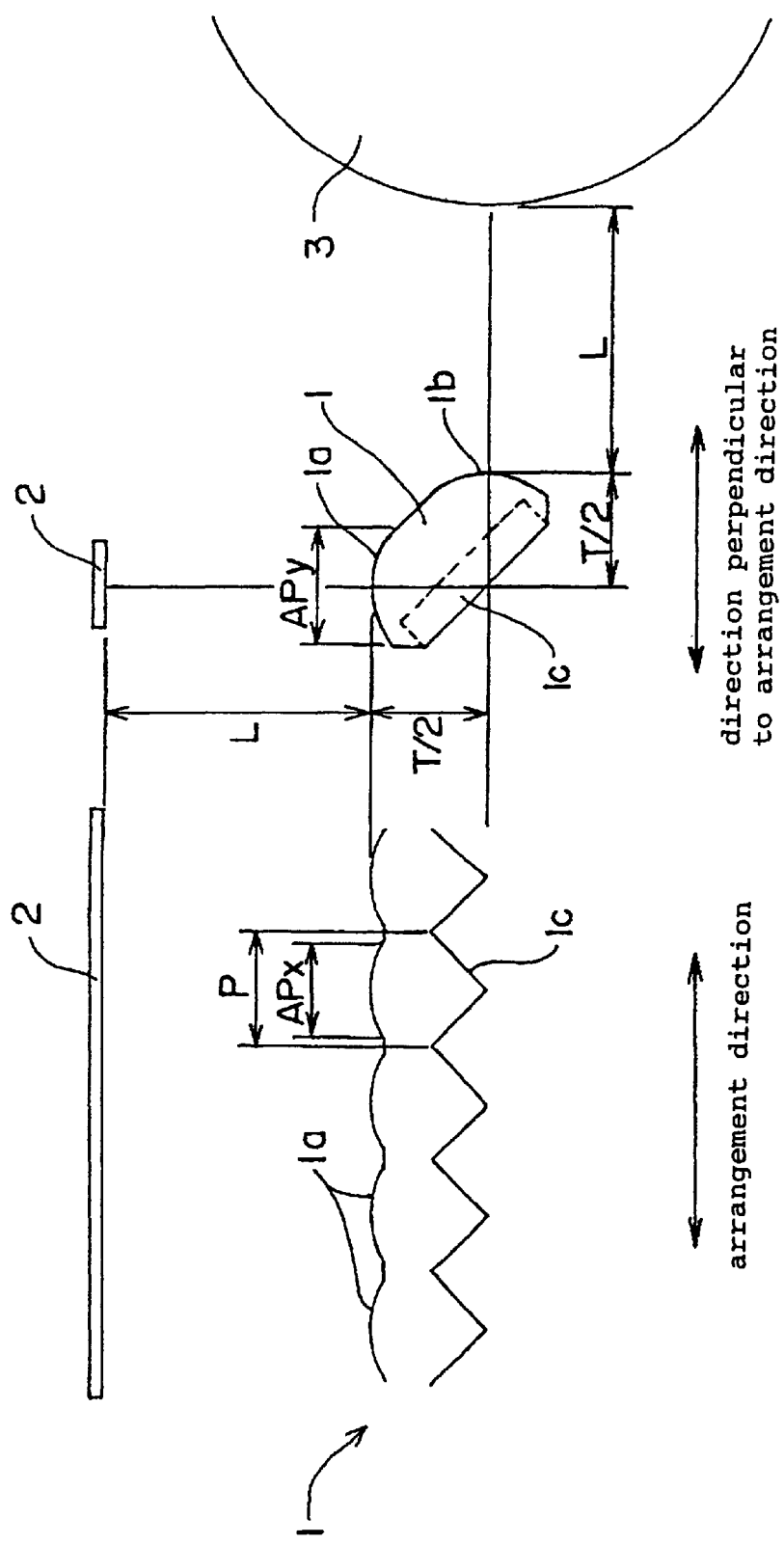
FIG. 2 is a section drawing illustrating a portion of an image forming apparatus including an optical printing head having an image forming elements array according to a preferred embodiment of the present invention.

In FIG. 2, an image forming elements array 1 forms a light flux emitted from each light emitting element of a light emitting elements array 2 and generates an optical beam spot on a scanned surface of a photoconductor 3. The image forming elements array 1 includes a plurality of image forming elements which are arranged along a line in an arrangement direction and integrated with each other. Each image forming element has an incident surface 1a positioned at the incident side, i.e., the light emitting elements array 2 side, an emerging surface 1b positioned at the emerging side, i.e., the scanned surface side, and a pair of reflective surfaces 1c which define a right angle relative to each other and are integral with each other. The image forming elements array 1 forms an image with the same magnification in the direction in which the image forming elements are arranged in the image forming elements array 2.

The pair of reflective surfaces 1c are arranged at right angles to each other and define a roof-prism lens. The reflective surfaces 1c do not affect an image forming operation and are slanted 45 degrees relative to the incident light axis. Further, the incident light axis and the emerging light axis of the image forming elements array 1 are substantially at right angles to each other.

In this preferred embodiment, the image forming elements array 1 includes a roof-prism lens array (RPLA), an incident side lens array and an emerging side lens array which are integrally constructed. The left side portion of FIG. 2 illustrates a section of the image forming elements array 1 viewed from the direction in which the image forming elements are arranged and the right side portion illustrates a section of the image forming elements array 1 viewed from a direction perpendicular to the image forming elements arrangement direction.

Because the image forming elements array 1 is arranged to generate an image having the same magnification as described above, the incident surface 1a and the emerging surface 1b are substantially equal to each other in shape and optically, and the distance from an object point on a surface of a light emitting element as an object plane of the light emitting elements array 2 to the incident surface 1a and the distance from the emerging surface 1b to an image point on the scanned surface of the photoconductor 3 are substantially equal. Therefore, the optical transmission efficiency is greatly improved and a much brighter image forming system is achieved. The incident surface 1a and emerging surface 1b both have a substantially spherical shape in FIG. 2, but can these elements can also have a non-spherical shape.

The light emitting elements array 2 is preferably constructed by arranging a plurality of light emitting elements, such as an LED element, each having an emitting surface, in substantially the same direction as the image forming elements, such that the array 2 emits a light flux in a direction that is substantially perpendicular relative to its substrate. The image forming elements array 1 and the light emitting elements array 2 constitute an optical printing head, which can be used as an exposure unit of an image forming apparatus.

A light flux emerging from a point of a surface of a light emitting element of the light emitting elements array 2 travels to the incident surface 1a of the image forming elements array 1, and is sequentially reflected by the pair of the reflective surfaces 1c and then emerges from the emerging surface 1b to reach the scanned surface of the photoconductor 3. The incident light axis and the emerging light axis are substantially at right angles to each other. An object at the point of the surface of the light emitting element is formed at a corresponding point on the scanned surface of the photoconductor 3 by the imaging function of the incident surface 1a and the emerging surface 1b. Thus, images at the plurality of light emitting elements arranged in a direction in the light emitting elements array 2 are connected with each other in a line on the scanned surface of the photoconductor 3. The direction in which the images are connected with each other along a line corresponds to the main scanning direction, and an image is formed on the scanned surface of the photoconductor 3 by controlling the plurality of light emitting elements in the light emitting elements array 2 to turn on and off while rotating the photoconductor 3 in the sub scanning direction.

As illustrated in FIG. 2, when the distance from an object point on a light emitting element surface of the light emitting elements array 2 to the incident surface 1b is represented by L, because the image forming elements array 1 forms an image having the same magnification, the distance from the emerging surface 1b to the scanned surface of the photoconductor 3 becomes also L. Further, when the distance from the incident surface 1a to the emerging surface 1b along the optical axis is represented by T, the distance from the incident surface 1a to the reflective surfaces 1c along the optical axis is T/2 and the distance from the reflective surfaces 1c to the emerging surface 1b along the optical axis is also T/2.

When a ratio between the distance T and the distance L, i.e., T/L, is within a range $0.20 \leq T/L \leq 0.50$, the transmission efficiency and the image forming performance are greatly improved and thereby, an excellent quality image is achieved. When the ratio T/L is higher than about 0.50, the transmission efficiency is decreased and when the ratio T/L is lower than about 0.20, the image forming performance is decreased, and as a result, a constant beam diameter cannot be obtained and poor image quality results. In order to take advantage of a solid scanning system so that a scanning apparatus including the solid scanning system is very compact, the distance L is preferably less than about 15mm.

Further, when the arrangement pitch of the image forming elements is represented by P, by setting the ratio P/L in a range: $0.16 \leq P/T \leq 0.50$, the transmission efficiency and the image forming performance are greatly improved and thereby, an excellent quality image is achieved. When the ratio P/T is higher than about 0.50, the image forming performance is decreased and as a result, a constant beam spot diameter can not be obtained. When the ratio P/T is lower than about 0.16, the transmission efficiency is decreased.

Furthermore, the arrangement pitch P is preferably shorter than about 1 mm, because, as described above, a human being is most sensible to non-uniform density occurring in a low frequency area, for example about 0.2 to about 1 cycle/mm, which corresponds to approximately 1 mm to about 5 mm in the arrangement pitch of image forming elements.

Next, specific examples of the image forming elements array 1 each arranged in an image forming apparatus are shown in Table 1 and the ratios T/L and P/T of each example are shown in Table 2.

In Table 1, R represents a paraxial radius of curvature, K represents a cone constant, A represents a coefficient of a non-spherical surface of the fourth degree. The non-spherical surface is a curved surface obtained by rotating around the optical axis a curved line which is expressed by the following formula: $Z=(1/R)\times Y^2/\{1+[1-(1+K)\times(Y/R)^2]\}+A\times Y^4$, with the Z coordinates set coincident with the optical axis and the Y coordinates set perpendicular to the optical axis.

Further, APx represents the length of an opening of the incident surface 1a and the emerging surface 1b of each image forming element, i.e., the effective area of the lens surface, in the direction in which the image forming elements are arranged in the image forming element array 1, and APy represents the effective area of the lens surface in the direction perpendicular to the direction in which the image forming elements are arranged. The beam spot diameter is expressed with respect to the image forming elements arrangement direction and the direction perpendicular to the image forming elements arrangement direction and indicates the diameter of a beam spot surface, which is obtained, when a light flux from a light source having the diameter of approximately 10 μm×10 μm and emitting a completely diffused light is imaged on a scanned surface, at the point of the light flux having the $1/e^2$ diameter. Further, the refractive index of the image forming element is approximately 1.525.

TABLE 1

| No. | L (mm) | T (mm) | P (mm) | R (mm) | K | A | Opening (mm) beam spot | (APx × APy) |
|---|---|---|---|---|---|---|---|---|
| 1 | 2.0 | 0.4 | 0.2 | 1.04994 | −11.38962 | 0.83689 | 0.16 × 0.20 | 14.6 × 13.8 |
| 2 | 2.0 | 1.0 | 0.2 | 1.04994 | −6.87620 | 0.44213 | 0.16 × 0.26 | 11.7 × 12.3 |
| 3 | 2.0 | 1.0 | 0.3 | 1.04994 | −6.87620 | 0.44213 | 0.25 × 0.36 | 12.3 × 14.7 |
| 4 | 8.0 | 2.0 | 0.6 | 4.19974 | 8.38164 | −0.02063 | 0.50 × 0.70 | 15.8 × 15.0 |
| 5 | 8.0 | 2.0 | 0.7 | 4.19974 | 8.38164 | −0.02063 | 0.60 × 1.00 | 14.9 × 15.7 |
| 6 | 8.0 | 2.0 | 0.8 | 4.19974 | 8.38164 | −0.02063 | 0.70 × 1.00 | 16.5 × 15.1 |
| 7 | 8.0 | 3.0 | 0.6 | 4.19974 | 6.94377 | −0.01745 | 0.50 × 1.00 | 12.9 × 16.3 |
| 8 | 8.0 | 3.0 | 0.7 | 4.19974 | 6.94377 | −0.01745 | 0.60 × 0.80 | 14.3 × 16.1 |
| 9 | 8.0 | 3.0 | 0.9 | 4.19974 | 6.94377 | −0.01745 | 0.80 × 1.00 | 15.4 × 15.4 |
| 10 | 8.0 | 3.0 | 1.0 | 4.19974 | 6.94377 | −0.01745 | 0.90 × 1.20 | 17.0 × 15.9 |
| 11 | 8.0 | 4.0 | 0.7 | 4.19974 | 5.08902 | −0.01357 | 0.60 × 0.90 | 12.4 × 13.9 |
| 12 | 8.0 | 4.0 | 0.8 | 4.19974 | 5.08902 | −0.01357 | 0.70 × 1.00 | 12.9 × 14.4 |
| 13 | 8.0 | 4.0 | 1.0 | 4.19974 | 5.08902 | −0.01357 | 0.90 × 1.20 | 13.8 × 15.4 |
| 14 | 8.0 | 4.0 | 1.2 | 4.19974 | 5.08902 | −0.01357 | 1.10 × 1.40 | 16.0 × 19.1 |
| 15 | 14.0 | 3.0 | 0.8 | 7.34955 | 8.09210 | −0.00367 | 0.70 × 1.00 | 15.3 × 16.1 |
| 16 | 14.0 | 3.0 | 1.0 | 7.34955 | 8.09210 | −0.00367 | 0.90 × 1.20 | 15.2 × 15.2 |
| 17 | 14.0 | 3.0 | 1.1 | 7.34955 | 8.09210 | −0.00367 | 1.00 × 1.60 | 16.3 × 15.6 |
| 18 | 14.0 | 4.0 | 0.9 | 7.34955 | 7.37901 | −0.00339 | 0.80 × 1.20 | 15.1 × 16.1 |
| 19 | 14.0 | 4.0 | 1.2 | 7.34955 | 7.37901 | −0.00339 | 1.10 × 1.60 | 16.6 × 15.1 |
| 20 | 14.0 | 5.0 | 1.0 | 7.34955 | 6.59684 | −0.00308 | 0.90 × 1.20 | 14.1 × 15.6 |
| 21 | 14.0 | 5.0 | 1.2 | 7.34955 | 6.59684 | −0.00308 | 1.10 × 1.40 | 15.0 × 15.5 |
| 22 | 14.0 | 5.0 | 1.3 | 7.34955 | 6.59684 | −0.00308 | 1.20 × 1.80 | 17.0 × 15.1 |
| 23 | 14.0 | 6.0 | 1.0 | 7.34955 | 5.72697 | −0.00275 | 0.90 × 1.40 | 13.5 × 16.0 |
| 24 | 14.0 | 6.0 | 1.4 | 7.34955 | 5.72697 | −0.00275 | 1.30 × 1.80 | 15.2 × 15.5 |
| 25 | 14.0 | 6.0 | 1.6 | 7.34955 | 5.72697 | −0.00275 | 1.50 × 2.00 | 16.9 × 16.6 |

TABLE 2

| No. | T/L | P/T |
|---|---|---|
| 1 | 0.200 | 0.500 |
| 2 | 0.500 | 0.200 |
| 3 | 0.500 | 0.300 |
| 4 | 0.250 | 0.300 |
| 5 | 0.250 | 0.350 |
| 6 | 0.250 | 0.400 |
| 7 | 0.375 | 0.200 |
| 8 | 0.375 | 0.233 |
| 9 | 0.375 | 0.300 |
| 10 | 0.375 | 0.333 |
| 11 | 0.500 | 0.175 |
| 12 | 0.500 | 0.200 |
| 13 | 0.500 | 0.250 |
| 14 | 0.500 | 0.300 |
| 15 | 0.214 | 0.267 |
| 16 | 0.214 | 0.333 |
| 17 | 0.214 | 0.367 |
| 18 | 0.286 | 0.225 |
| 19 | 0.286 | 0.300 |
| 20 | 0.357 | 0.200 |
| 21 | 0.357 | 0.240 |
| 22 | 0.357 | 0.260 |
| 23 | 0.429 | 0.167 |
| 24 | 0.429 | 0.233 |
| 25 | 0.429 | 0.266 |

As indicated in Tables 1 and 2, the ratio T/L is smallest, i.e., 0.200, in example No. 1 in which L=2.0 mm and T=0.4 mm, and largest, i.e., 0.500, in examples Nos. 2, 3, 11, 12, 13, 14, in which L=2.00 mm and T=1.00 mm. However, the ratio T/L is within a range satisfying the condition $0.20 \leq T/L \leq 0.50$ in all of the examples. Accordingly, the transmission efficiency and the image forming performance are greatly improved and thereby, an excellent quality image is achieved in all examples.

Further, the ratio P/T is smallest, i.e., 0.167, in example No. 23 in which P=1.0 mm, and T=6.0 mm, and largest, i.e., 0.500 in example No. 1 in which P=0.2 mm and T=0.4 mm. However, the ratio P/T is within a range satisfying the condition $0.16 \leq P/T \leq 0.50$ in all of the examples. Accordingly, the transmission efficiency and the image forming performance are greatly improved and thereby, an excellent quality image is achieved in all of the examples. Particularly, by making the arrangement pitch of the image forming elements shorter than about 1 mm, as in examples Nos. 1, 2, non-uniformity of image density can be suppressed to a level that is not detectable by a human being.

Further, the beam spot diameter of each example does not differ much in the image forming elements arrangement direction and the direction perpendicular to the image forming elements arrangement direction. Thus, beam spots having relatively a small diameter and a good circularity are reliably formed, and accordingly, a very high resolution and an excellent quality image are achieved.

Figure 3:
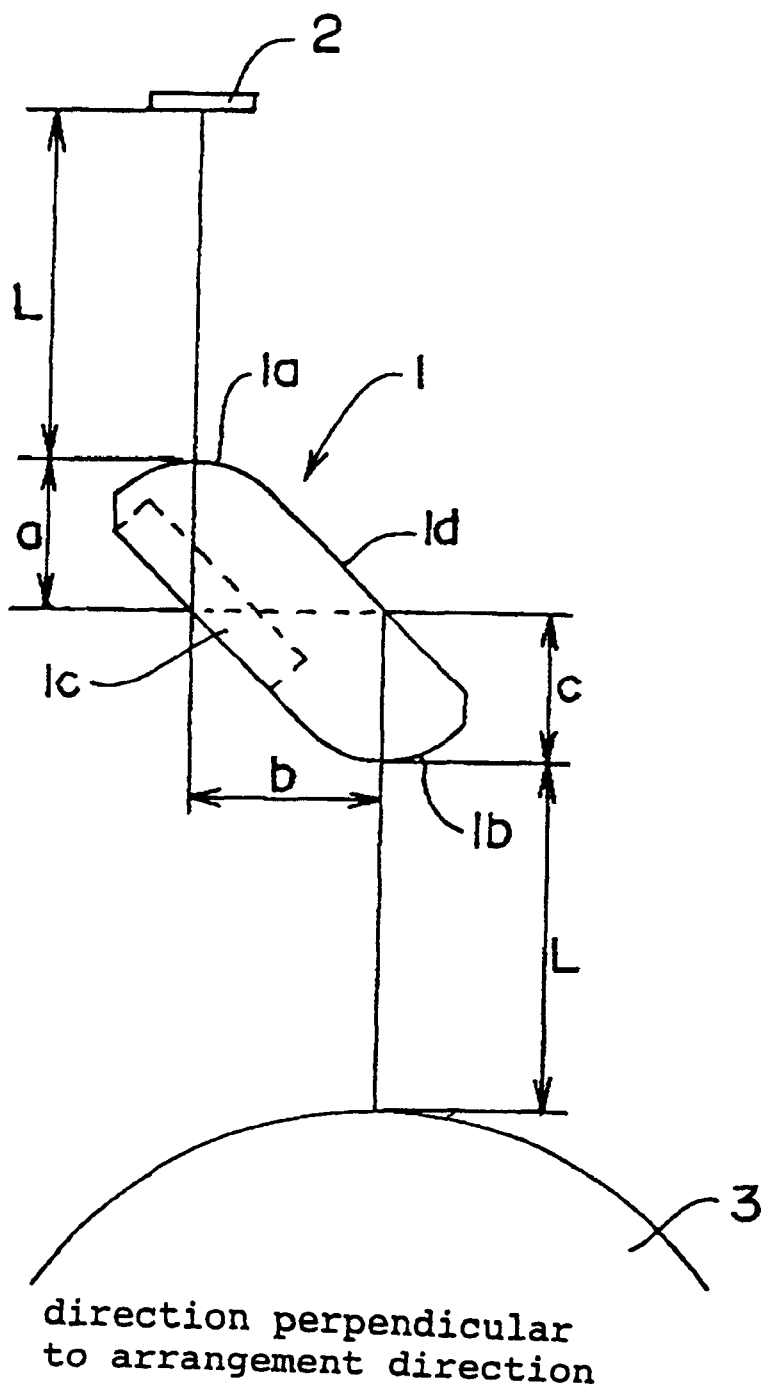
FIG. 3 is a section drawing illustrating a portion of an image forming apparatus including an optical printing head using an image forming elements array according to another preferred embodiment of the present invention.

In the image forming elements array 1 of FIG. 2, the launching optical axis and the emerging optical axis are substantially at right angles to each other. However, the present invention can be also applied to an image forming elements array in which the launching optical axis and the emerging optical axis are substantially parallel to each other, as illustrated in FIG. 3. In FIG. 3, an image forming elements array 1 forms a light flux from each light emitting element of a light emitting elements array 2 into an optical spot on a scanned surface of a photoconductor 3. The image forming elements array 1 includes a plurality of image forming elements which are arranged along a line extending in an arrangement direction and are integrated with each other. Each image forming element has an incident surface 1a positioned at the incident side, i.e., the light emitting elements array 2 side, an emerging surface 1b positioned at the emerging side, i.e., the scanned surface side, and a pair of reflective surfaces 1c defining a right angle relative to each other so as to guide a light flux from the incident surface 1a toward the emerging surface 1b, and a reflective surface 1d arranged on a light path from the reflective surfaces 1c to the emerging surface 1b so as to oppose the reflective surfaces 1c, which are integrally formed with each other. The image forming elements array 1 is configured so as to form an image with the same magnification in the direction in which the image forming elements are arranged in the image forming elements array 1. In FIG. 3, a section of the image forming elements array 1 viewed from the direction perpendicular to the direction in which the image forming elements are arranged is illustrated.

The pair of reflective surfaces 1c are arranged at right angles relative to each other and define a roof-prism lens. The reflective surfaces 1c do not affect an image forming operation and are inclined 45 degrees relative to the incident light axis. Further, as illustrated in FIG. 2, the incident surface 1a and the emerging surface 1b are substantially parallel to each other and accordingly, the incident light axis and the emerging light axis are substantially parallel to each other.

Because the image forming element array 1 is an image erecting system with the same magnification as described above, the incident surface 1a and the emerging surface 1b are substantially equal to each other in shape and optically, and the distance from an object point on a light emitting element surface of the light emitting element array 2 to the incident surface 1a and the distance from the emerging surface 1b to an image point on the scanned surface of the photoconductor 3 are substantially equal.

The light emitting elements array 2 is preferably constructed by arranging a plurality of light emitting elements having emitting surfaces, such as an LED element, in substantially the same direction as the image forming elements, and emits a light flux in a direction that is substantially perpendicular relative to its substrate. The image forming elements array 1 and the light emitting elements array 2 constitute an optical printing head, which can be used as an exposure unit of an image forming apparatus.

A light flux emerging from a point of a surface of a light emitting element of the light emitting elements array 2 is transferred to the incident surface 1a of the image forming elements array 1, and is sequentially reflected by the pair of the reflective surfaces 1c and by the reflective surface 1d, and then emerges from the emerging surface 1b to reach the scanned surface of the photoconductor 3. The incident light axis and the emerging light axis are substantially at right angles to each other. An object at the point of the surface of the light emitting element is formed at a corresponding point on the scanned surface of the photoconductor 3 by the imaging function of the incident surface 1a and the emerging surface 1b. Thus, images at the plurality of light emitting elements arranged in a direction in the light emitting elements array 2 are connected with each other in a line on the scanned surface of the photoconductor 3. The direction in which the images are connected with each other in a line corresponds to the main scanning direction, and an image is formed on the scanned surface of the photoconductor 3 by controlling the plurality of light emitting elements 2 to turn on and off while rotating the photoconductor 3 in the sub scanning direction.

As illustrated in FIG. 3, when the distance from an object point on a light emitting element surface of the light emitting elements array 2 to the incident surface 1b is represented by L, because the image forming elements array 1 is an image erecting system with the same magnification, the distance from the emerging surface 1b to the scanned surface of the photoconductor 3 becomes also L. Further, when the distance from the incident surface 1a to the emerging surface 1b along the optical axis is represented by T, T is the sum of a distance "a" along the optical axis from the incident surface 1a to the reflecting surfaces 1c, a distance "b" along the optical axis from the reflective surfaces 1c to the reflective surface 1d and a distance "c" along the optical axis from the reflective surface 1d to the emerging surface 1b, i.e., a+b+c=T.

When the ratio T/L is within a range satisfying the following condition $0.20 \leq T/L \leq 0.50$, the transmission efficiency and the image forming performance are greatly improved and thereby, an excellent quality image is formed.

Further, when the arrangement pitch of the image forming elements is represented by P, by setting a ratio P/T in a range satisfying the following condition $0.16 \leq P/T \leq 0.50$, the transmission efficiency and the image forming performance are greatly improved and thereby, an excellent quality image is achieved. Furthermore, the arrangement pitch P may be preferably shorter than about 1 mm, so that non-uniformity of image density is suppressed to a level that is not detectable to a human being.

In the above preferred embodiments, both of the incident surface 1a and the emerging surface 1b are preferably substantially spherical. However, the incident surface 1a and the emerging surface 1b can be non-spherical surface, so that aberration of the image forming elements is well corrected, and thereby variation in the beam spot diameters is suppressed and beam spots having a relatively small diameter can be formed, and as a result, the image forming performance is even more improved such that even higher resolution and even more excellent quality images can be formed.

Further, a shielding member can be formed, for example by evaporation, printing or other similar methods, on portions other than the effective areas (indicated by APX and APy in FIG. 2) of the lens surface of the incident surface 1a and the emerging surface 1b of each image forming element of the above image forming elements array 1, which are generally not precisely shaped. By providing such a shielding member, a light flux passing through such portions of the lens surface other than the effective areas of the lens surface is shielded, and thereby, a decrease of the transmission efficiency and disturbance of the shape of an optical spot are avoided, and a resulting decrease of the quality of an image is avoided.

Furthermore, the above image forming elements array 1 can be used as an image forming elements array for an optical printing head. That is, an optical printing head may be configured to include the above image forming elements array 1 and a light emitting elements array and to form a light flux from each light emitting element of the light emitting elements array into an optical beam spot on a scanned surface of a photoconductor or other such member.

Now, a preferred embodiment of the present invention will be described, in which the image forming performance is greatly improved and thereby, an excellent quality image is achieved by arranging a plurality of image forming elements having an incident surface, an emerging surface and a pair of reflective surfaces to extend along an arrangement direction and so as to be integrated with each other, and by making the incident surface and the emerging surface non-spherical and the arrangement pitch of the image forming elements shorter than about 1 mm.

In FIGS. 4, 5(a), 5(b) and 6, an image forming elements array 21 forms a light flux emitted from each light emitting element of a light emitting elements array 22 into an optical beam spot on a scanned surface of a photoconductor 23. The image forming elements array 21 includes a plurality of image forming elements arranged in an arrangement direction and integrated with each other. Each image forming element has an incident surface 21a positioned at the incident side, i.e., the light emitting elements array 22 side, an emerging surface 21b positioned at the emerging side, i.e., the scanned surface side, and a pair of reflective surfaces 21c forming a right angle relative to each other, which are integral with each other. The image forming elements array 21 forms an erected image with the same magnification in the direction in which the image forming elements are arranged in the image forming elements array 21.

Figure 4:
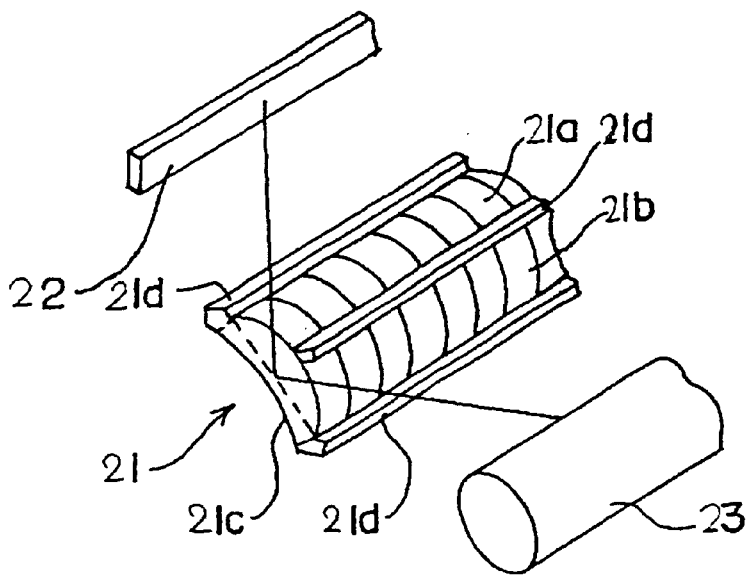
FIG. 4 is a schematic drawing illustrating a portion of an image forming apparatus including an optical printing head using an image forming elements array according to still another preferred embodiment of the present invention.

The pair of reflective surfaces 21c are arranged at right angles to each other thereby defining a roof-prism lens. The reflective surfaces 21c do not affect an image forming operation and are slanted 45 degrees relative to the incident light axis. A rod-like shaped rib 21d is integrally formed at the border of the incident surface 21a and the emerging surface 21b of the image forming elements and at each edge part of the incident surface 21a and the emerging surface 21b, which is parallel to the direction in which the image forming elements are arranged, for strengthening the structure of the image forming elements array 21 and improving the positional precision of each element. The shape of the rib 21d illustrated in FIG. 4 is only an example and can have any shape. Further, the incident light axis and the emerging light axis of the image forming elements array 21 are substantially at right angles to each other.

In this preferred embodiment, the image forming elements array 21 includes a roof-prism lens array (RPLA), an incident side lens array and an emerging side lens array which are integral with each other.

The image forming elements array 21 is configured to form an erected image with the same magnification in the direction in which the image forming elements are arranged, as described above. That is, the incident surface 21a and the emerging surface 21b have substantially the same spherical shape and are optically equal to each other, and the distance from an object point on a surface of a light emitting element as an object plane of the light emitting elements array 22 to the incident surface 21a and the distance from the emerging surface 21b to an image point on the scanned surface of the photoconductor 23 are substantially equal. Therefore, the distortive aberration is substantially zero and the transmission efficiency is greatly improved, and thereby, a much brighter image forming system is achieved. The non-spherical shape of the incident surface 21a and the emerging surface 21b will be described later.

A light flux emerging from a point of a surface of a light emitting element of the light emitting elements array 22 is transmitted to the incident surface 21a of the image forming elements array 21, and is sequentially reflected by the pair of the reflective surfaces 21c and then emerges from the emerging surface 21b to reach the scanned surface of the photoconductor 23. The incident light axis and the emerging light axis are substantially at right angles to each other. An object at the point of the surface of the light emitting element is formed at a corresponding point on the scanned surface of the photoconductor 23 by the imaging function of the incident surface 21a and the emerging surface 21b. Thus, images at the plurality of light emitting elements arranged in a direction in the light emitting elements array 22 are connected with each other in a line on the scanned surface of the photoconductor 23. The direction in which the images are connected with each other in a line corresponds to the main scanning direction, and an image is formed on the scanned surface of the photoconductor 23 by controlling the plurality of light emitting elements in the light emitting elements array 22 to turn on and off while rotating the photoconductor 23 in the sub scanning direction.

Figure 5A:
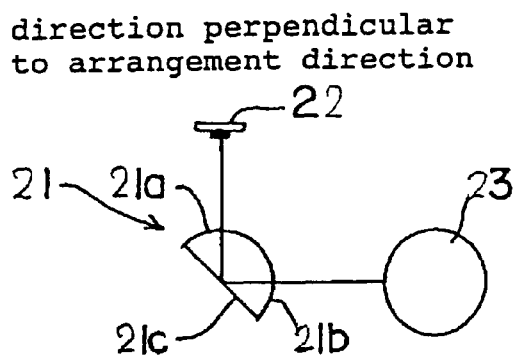
FIGS. 5(a) and 5(b) are section drawings illustrating the optical system of the optical printing head of FIG. 4 viewed in the direction perpendicular to the direction in which the image forming elements are arranged in the image forming elements array and in the direction in which the image forming elements are arranged, respectively.
Figure 5B:
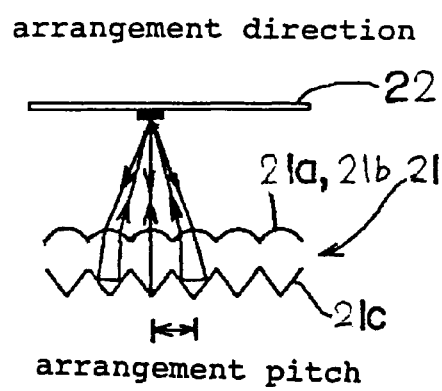

As illustrated in FIG. 5(b), the arrangement pitch of the image forming elements in the image forming elements array 21 is preferably less than about 1 mm. As described above, a human being is most sensible to non-uniform density in an image occurring when the arrangement pitch of the image forming elements is about 1 mm to about 5 mm (corresponding to a low frequency area of less than 1 about cycle/mm). Therefore, the arrangement pitch of the image forming elements is preferably less than about 1 mm so that even when non-uniform image density periodically occurs in an image, the non-uniformity is suppressed to a level that is not detectable by a human being. Further, if the arrangement pitch is less than about 0.5 mm, the frequency area is further deviated from the area which is sensible by a human being and thereby, the non-uniformity in an image can be further suppressed to a level that is detectable by a human being.

As described above, in the image forming elements array 21, image forming elements are integrally formed. Therefore, problems that tend to occur when a lens array with distributed refractive index is constructed by bundling lenses having distributed refractive index respectively and sticking them with each other by adhesive or the like, i.e., a problem that the optical axis of each image forming element deviates from that of the other image forming elements due to an assembly error or the like and thereby the focal point varies, is avoided.

Further, although not illustrated in the drawings, an openings array defining an opening member is arranged between the light emitting elements array 22 and the image forming elements array 21 or between the image forming elements array 21 and the scanned surface of the photoconductor 23 such that the arrangement pitch of the openings corresponds to the arrangement pitch of the image forming elements of the image forming elements array 21. The openings array is arranged mainly to eliminate a flare light but also reforms the shape of a light beam.

Figure 7:
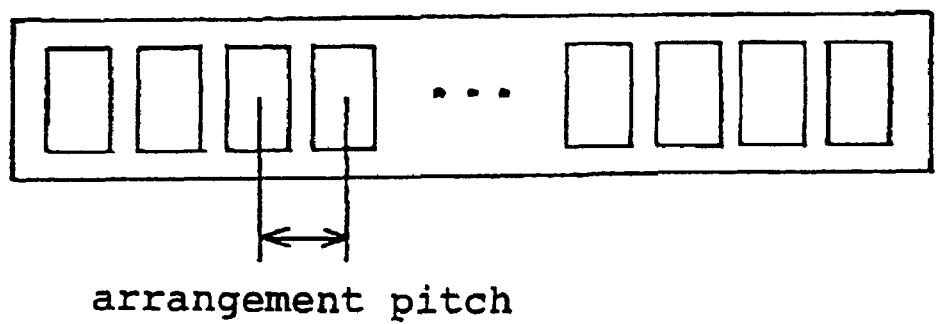
FIG. 7 is a front view of an example of an openings array which may be applied to an image forming elements array of preferred embodiments of the present invention.

As illustrated in FIG. 7, each of the openings may have a substantially rectangular shape in which the width in the direction in which the image forming elements are arranged is shorter than the length in the direction perpendicular to the image forming elements arrangement direction. Further, the center of each opening coincides with the optical axis of each image forming element. The openings may have other shapes, such as an oval or a rectangle having rounded corners.

Next, the non-spherical shape of the incident surface 21a and the emerging surface 21b are described. The non-spherical shape $X_{ASP}(H)$ of the incident surface 21a and the emerging surface 21b is made so as to satisfy the condition: $X_{ASP}(H)=H^2/[R+R\{1-(1+K)(H/R)^2\}]+AH^4+BH^6+CH^8+DH^{10}$ ... wherein H represents a lens height, R represents a paraxial radius of curvature, K represents a cone constant, and A, B, C, D represent fixed numbers.

Figure 16:
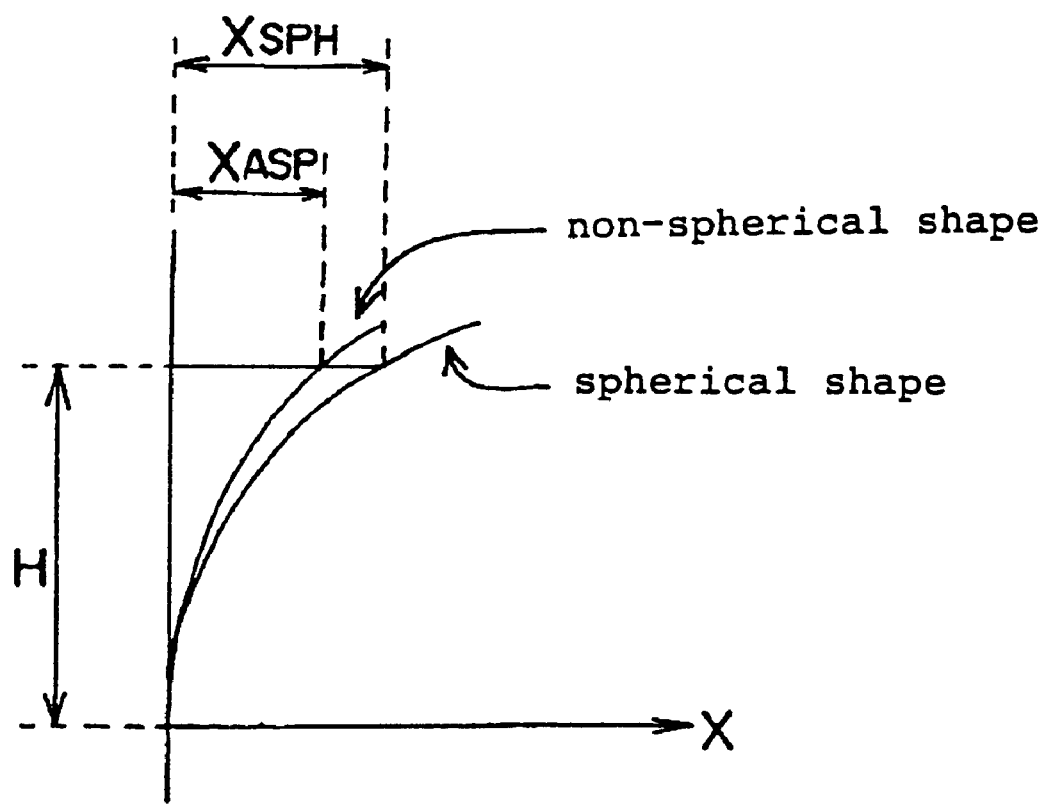
FIG. 16 is a diagram illustrating a deviation amount of a non-spherical shape from a spherical shape at an image height.

When the spherical shape $X_{ASP}(H)$ is made to satisfy the condition; $X_{ASP}(H)=H^2/[R+R\{1-(H/R)^2\}]$, and the deviation amount (H) of the non-spherical shape $X_{ASP}(H)$ from the spherical shape $X_{SPH}(H)$ is expressed by the formula; $(H)=X_{ASP}(H)-X_{SPH}(H)$, the non-spherical shape $X_{ASP}(H)$ is set such that the above deviation amount (H) continuously decrease as the lens height H increases. The deviation amount (H) is more concretely a difference between the spherical shape $X_{SPH}(H)$ and the non-spherical shape $X_{ASP}(H)$ according to the lens height H, as illustrated in FIG. 16.

Figure 6:
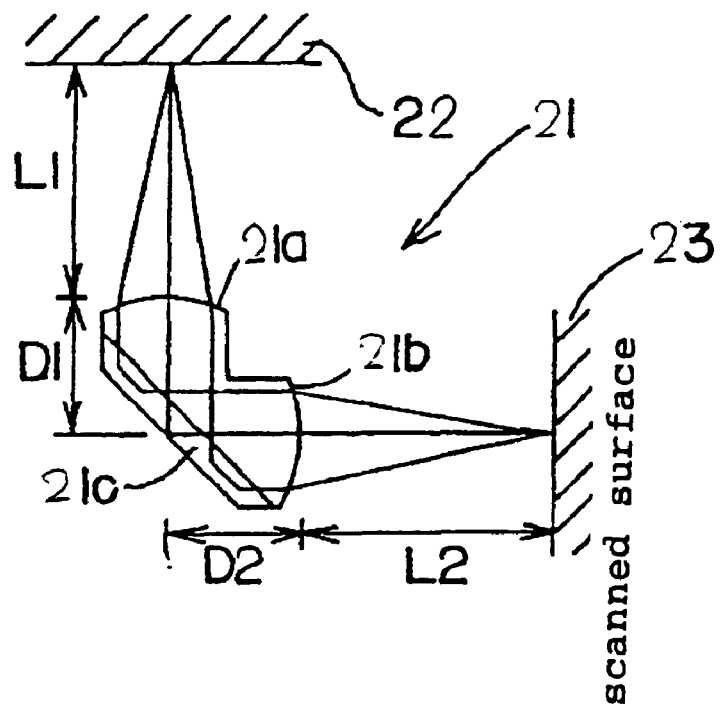
FIG. 6 is a section drawing of the optical printing head of FIG. 4 indicating the distance between the incident and emerging surfaces of the image forming elements array.

Now, an example of concrete optical data is described next. As illustrated in FIG. 6, the distance from an object point on a surface of a light emitting element of the light emitting elements array 22 to the incident surface 21a of the image forming elements array 21 is denoted by L1, the distance from the emerging surface 21b of the image forming elements array 21 to an object point on the scanned surface of the photoconductor 23 is denoted by L2, the distance from the incident surface 21a to the pair of reflective surfaces 21c on the optical axis is denoted by D1 and the distance from the pair of reflective surfaces 21c to the emerging surface 21b on the optical axis is denoted by D2. The unit of the amount having a length dimension is "mm".

L1=L2=9.0
D1=D2=1.6
Refractive inex=1.525
Arrangement pitch=0.9
Opening width (in the arrangement direction)=0.8
Opening length (in the direction perpendicular to the arrangement direction)=1.0
The non-spherical shape of the incident surface 21a:
R=4.721
K=14.2887
A=-2.2693E-2
B=0.0
C=0.0
D=0.0 The non-spherical shape of the emerging surface 21b:
R=4.721
K=14.2887
A=2.2693E-2
B=0.0
C=0.0
D=0.0

Figure 8:
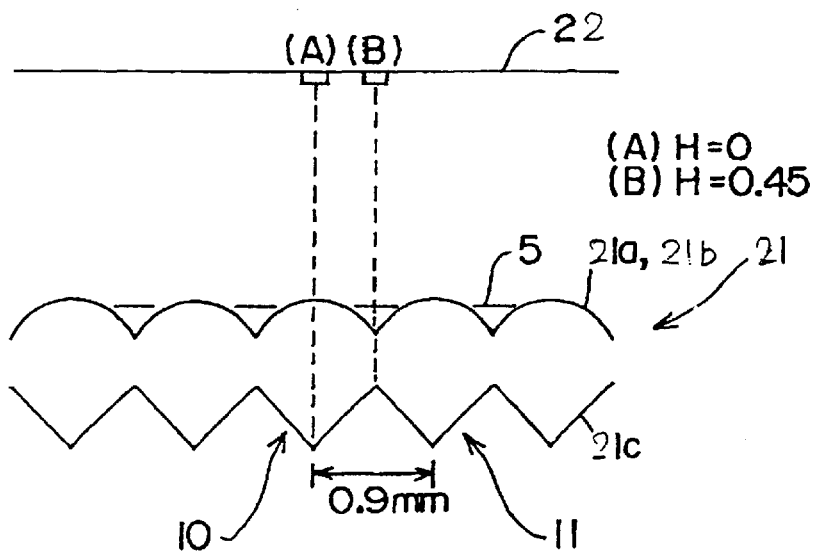
FIG. 8 is an optical arrangement view of the image forming elements array of FIG. 4.

Data of the beam spot diameter ($1/e^2$) with the above configuration is shown next. The data is shown for two lens height positions, which are indicated by (A) and (B) in FIG. 8, the position (A) being on the optical axis of an image forming element 10 and the position (B) being on the connecting border of the image forming element 10 and an adjacent image forming element 11. Further, the image forming elements of the image forming elements array 1 are preferably arranged within the arrangement pitch of about 0.9 mm in the image forming elements arrangement direction and are integrated with each other. Numeral 5 indicates an openings array formed in a flat plate. As the light emitting elements array 2, an LED array having about a 600 dpi resolution is preferably used. Each LED has the emitting surface of about 20 m×20 m and emits a completely diffused light.

Data of the beam spot diameter ($1/e^2$) is as follows;(in the image forming elements arrangement direction)
at (A)H=0.0, 29 m
at (B)H=0.45, 30 m
(in the direction perpendicular to the image forming elements arrangement direction)

at (A)H=0.0, 30 m at (B)H=0.45, 30 m

As the above data shows, the beam spot diameter is substantially the same in the direction in which the image forming elements are arranged in the image forming elements array 21 and in the direction perpendicular to the image forming elements arrangement direction and at two image height positions. In addition, the beam spot diameter is significantly smaller than the arrangement pitch (approximately 42.3 m) of the light emitting elements. Therefore, optical beam spots with a relatively small diameter and a good circularity are formed with the arrangement pitch close to that of the light emitting elements, and thereby an excellent quality image is achieved.

Figure 9:
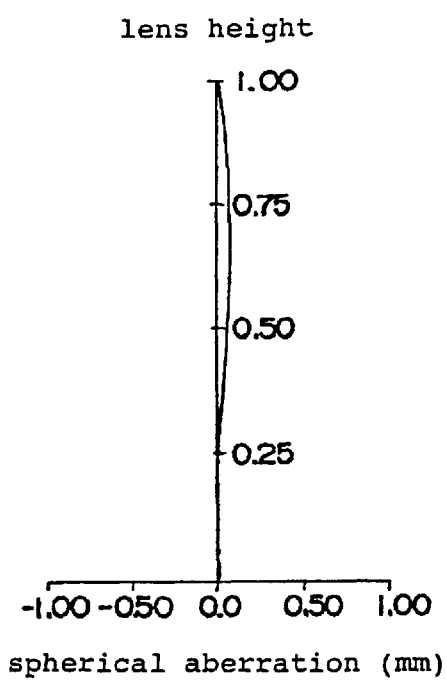
FIG. 9 is a diagram indicating spherical aberration of the image forming elements array having optical data according to a preferred embodiment of the present invention.

FIG. 9 is a diagram illustrating the spherical aberration of the image forming elements array 21 having the above described data. As indicated by the diagram of FIG. 9, the spherical aberration is relatively small regardless of the lens height position. Thus, the spherical aberration is suppressed and made relatively small regardless of the lens height position by making the incident surface 21a and the emerging surface 21b non-spherical. As a result, the image forming performance of each image forming element and the image forming elements array 21 is greatly improved.

Figure 10:
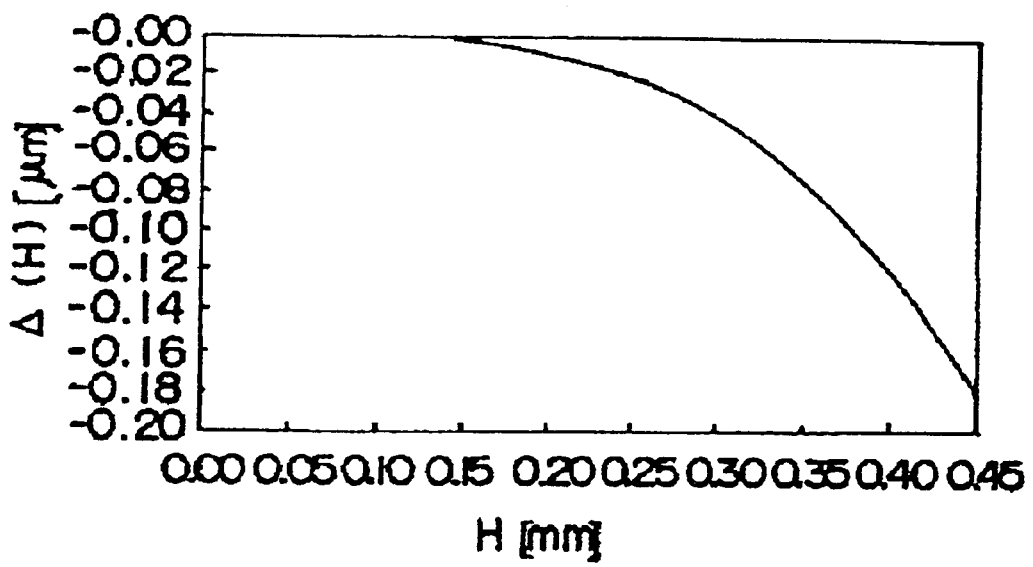
FIG. 10 is a graph indicating the deviation amount of the non-spherical shape from the spherical shape in the image forming elements array having the spherical aberration of FIG. 9.
Figure 15:
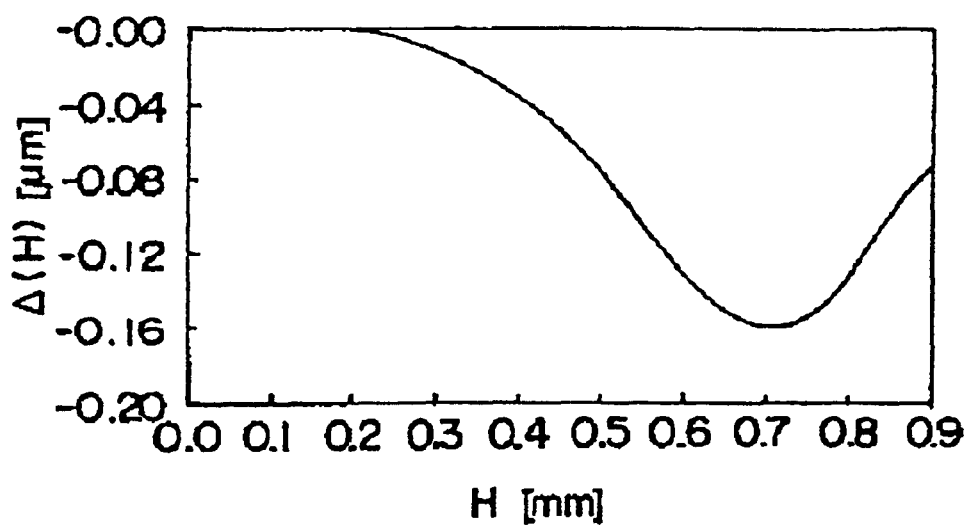
FIG. 15 is a graph indicating an example of a deviation amount of a non-spherical shape from a spherical shape having an extreme value.

FIG. 10 is a graph illustrating the deviation amount (H) of the non-spherical shape $X_{ASP}(H)$ from the spherical shape $X_{SPH}(H)$. As indicated by the graph, the deviation amount (H) continuously decreases as the lens height H increases. That is, the non-spherical shape $X_{ASP}(H)$ is set such that the deviation amount (H) decreases as the lens height H increases. Thus, by making the incident surface 21a and the emerging surface 21b a continuous non-spherical shape, the processing and manufacturing properties of the image forming elements array 21 are greatly improved compared to when the deviation amount (H) of the non-spherical shape of the incident surface 21a and the emerging surface 21b from the spherical shape has an extreme value as illustrated in FIG. 15.

Another example of specific optical data is described next.

As illustrated in FIG. 6, the distance from an object point on a surface of a light emitting element of the light emitting elements array 22 to the incident surface 21a of the image forming elements array 21 is denoted by L1, the distance from the emerging surface 21b of the image forming elements array 21 to an object point on the scanned surface of the photoconductor 23 is denoted by L2, the distance from the incident surface 21a to the pair of reflective surfaces 21c on the optical axis is denoted by D1 and the distance from the pair of reflective surfaces 21c to the emerging surface 21b along the optical axis is denoted by D2. The unit of the amount having a length dimension is "mm".

L1=L2=6.0

D1=D2=1.0

Refractive inex=1.525

Arrangement pitch=0.6

Opening width (in the arrangement direction)=0.5

Opening length (in the direction perpendicular to the arrangement direction)=1.6

The non-spherical shape of the incident surface 21a:

R=3.148

K=18.4257

A=-9.6487E-2

B=0.0

C=0.0

D=0.0

The non-spherical shape of the emerging surface 21b:

R=-3.148

K=18.4257

A=9.6487E-2

B=0.0

C=0.0

D=0.0

Figure 11:
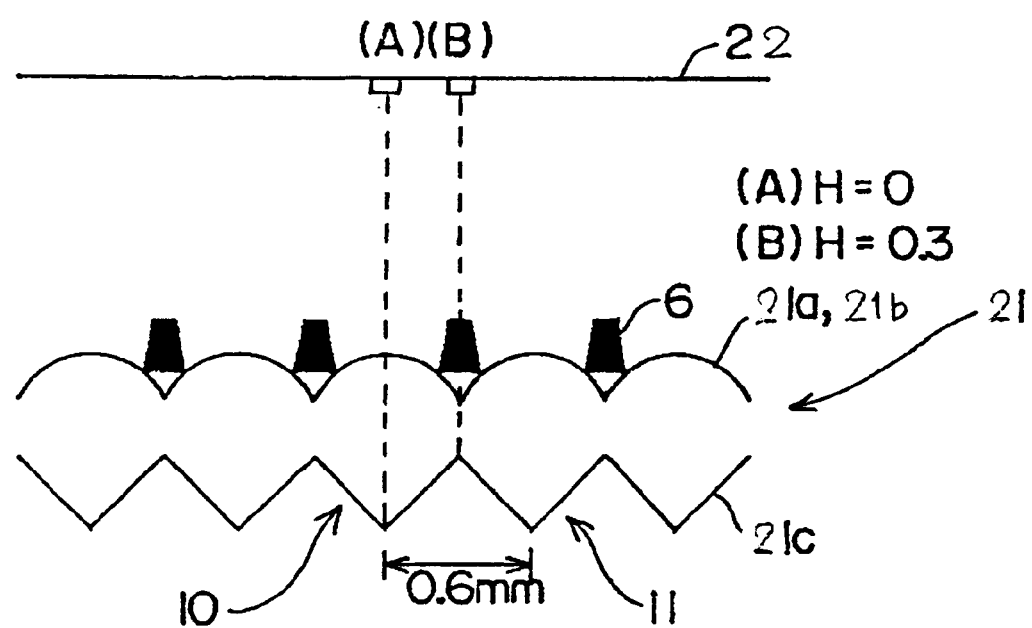
FIG. 11 is an optical arrangement view of an image forming elements array according to another preferred embodiment of the present invention.

Data of the beam spot diameter ($1/e^2$) with the above configuration is shown next. The data is shown for two lens height positions, which are indicated by (A) and (B) in FIG. 11, the position (A) being on the optical axis of an image forming element 10 and the position (B) on the connecting border of the image forming element 10 and an adjacent image forming element 11. Further, the image forming elements of the image forming elements array 21 are arranged with the pitch of about 0.6 mm in the image forming elements arrangement direction and are integrated with each other. Numeral 6 indicates an openings array, in which the width of an interval between the openings in the direction in which the openings are arranged at the surface of the openings array 6 facing the image forming elements array 21 (i.e., the shielding width) is wider than the width of the openings interval at the surface facing the light emitting elements array 22. As the light emitting elements array 22, an LED array having 600 dpi resolution is preferably used. Each LED has the emitting surface of about 20 m×20 m and emits a completely diffused light.

Data of the beam spot diameter ($1/e^2$) is as follows: (in the image forming elements arrangement direction)

at (A)H=0.0, 27 m at (B)H=0.30, 27 m (in the direction perpendicular to the image forming elements arrangement direction)

at (A)H=0.00, 28 m at (B)H=0.30, 29 m

As the above data shows, the beam spot diameter is substantially the same in the direction in which the image forming elements are arranged in the image forming elements array 21 and in the direction perpendicular to the image forming elements arrangement direction and at two image height positions. In addition, the beam spot diameter is significantly smaller than the arrangement pitch (approximately 42.3 m) of the light emitting elements. Therefore, optical beam spots having a relatively small diameter and a good circularity are formed with the pitch close to that of the light emitting elements, and thereby an excellent quality image is formed.

Figure 12:
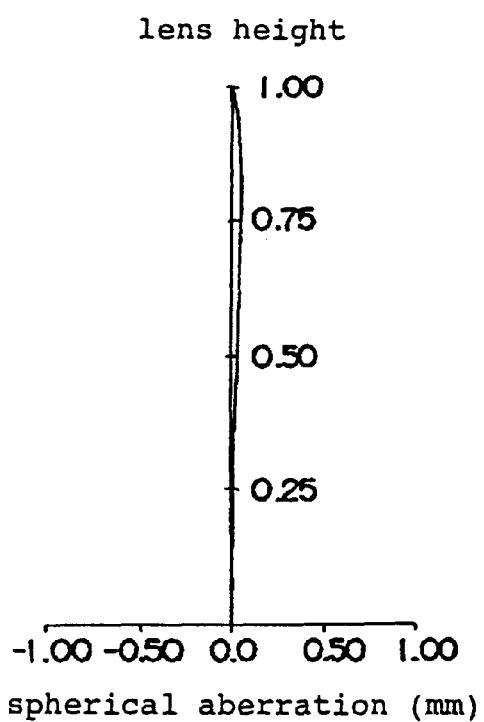
FIG. 12 is a diagram indicating spherical aberration of the image forming elements array having another optical data according to a preferred embodiment of the present invention.

FIG. 12 is a diagram illustrating the spherical aberration of the image forming elements array 21 having the above described data. As indicated by the diagram of FIG. 12, the spherical aberration is relatively small regardless of the lens height position. Thus, the spherical aberration can be suppressed and made relatively small regardless of the lens height position by making the incident surface 21a and the emerging surface 21b non-spherical. As a result, the image forming performance of each image forming element and the image forming elements array 21 is greatly improved.

Figure 13:
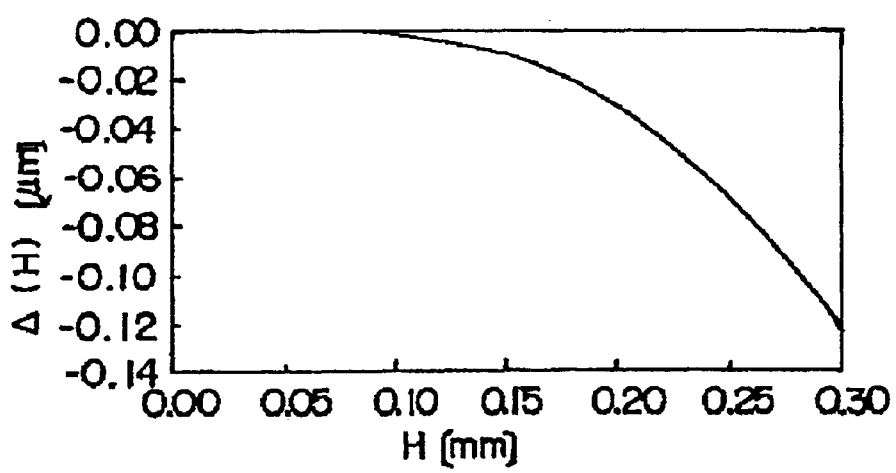
FIG. 13 is a graph indicating the deviation amount of the non-spherical shape from the spherical shape in the image forming elements array having the spherical aberration of FIG. 12.

FIG. 13 is a graph illustrating the deviation amount (H) of the non-spherical shape $X_{ASP}(H)$ from the spherical shape $X_{SPH}(H)$. As indicated by the graph, the deviation amount (H) continuously decreases as the lens height H increases. That is, the non-spherical shape $X_{ASP}(H)$ is set such that the deviation amount (H) decreases as the lens height H increases. Thus, by making the incident surface 21a and the emerging surface 21b a continuous non-spherical shape, the processing and manufacturing properties of the image forming elements array 21 are greatly improved compared to when the deviation amount of the non-spherical shape of the incident surface 21a and the emerging surface 21b from the spherical shape has an extreme value as illustrated in FIG. 15.

Figure 14:
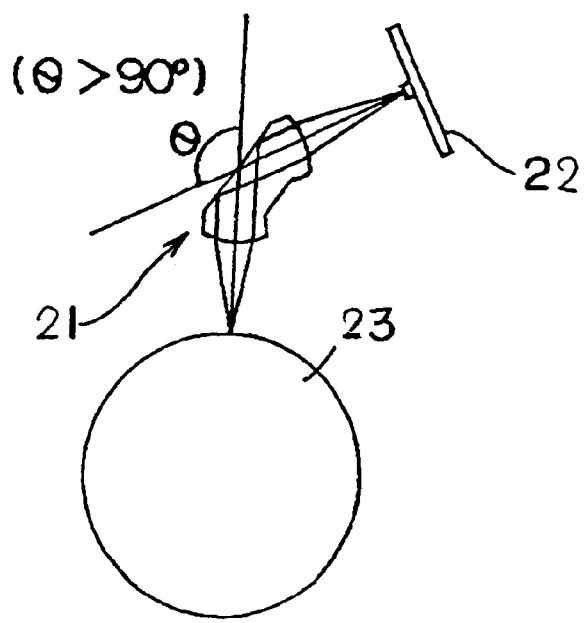
FIG. 14 is an optical arrangement view of an optical printing head according to another preferred embodiment of the present invention.

The image forming elements array 21 can be formed as illustrated in FIG. 14 such that the angle between the incident light axis of a light flux emitted from a light emitting element of the light emitting elements array 22 and the emerging light axis toward the scanned surface of the photoconductor 23, i.e., the light path separating angle, is greater than about 90 degrees. By making the light path separating angle greater than about 90 degrees, the freedom in the arrangement of the light path separation is greatly improved. In particular, when an optical printing head is constructed by combining the image forming elements array 21 and the light emitting elements array 22 and the optical printing head is used in an image forming apparatus, positional interference between the optical printing head and the photoconductor 23 or other units arranged around the photoconductor 23 is avoided by making the light path separating angle greater than about 90 degrees, and thereby the image forming apparatus can be made relatively compact.

The above-described image forming elements array 21 can be used as an image forming elements array for use in an optical printing head. Specifically, an optical printing head may include the above-described image forming elements array 21 and the light emitting elements array 22 and may be configured such that a light flux from each light emitting element of the light emitting elements array 22 forms an optical beam spot on the scanned surface of the photoconductor 23 via at least two image forming elements of the image forming elements array 21. Therefore, an optical system brighter than an image forming elements array having an inverted image forming system can be realized.

As described above, an opening member for eliminating a flare light can be provided between the light emitting elements array 22 and the image forming elements array 21 or between the image forming elements array 21 and the scanned surface of the photoconductor 23 such that the arrangement pitch of the openings corresponds to the arrangement pitch of the image forming elements of the image forming elements array 21. In background art, a flare light is eliminated, for example, by forming a groove at the connecting border of two image forming elements or by inserting a shielding member between the two adjacent image forming elements. However, when a notched groove is formed at the connecting border of two image forming elements, for example, the part of the image forming elements array where such a notched groove is formed becomes thin. Therefore, the strength of the image forming elements array is weakened and as a result, extreme care is required in handling the image forming elements array. Further, when an image forming elements array having such a notched groove is manufactured by an injection molding, resin is hard to be injected. Further, forming such an image forming elements array having a notched groove by molding is extremely difficult. Furthermore, it is difficult to make an image forming elements array in which a shielding member is inserted between two adjacent image forming elements using a molding method. Accordingly, for forming a good quality optical beam spot without deteriorating the processing properties of an image forming elements array, an opening member such as the above-described openings array is preferably provided. Further, each of the openings may preferably have a substantially rectangular shape in which the width in the direction in which the image forming elements are arranged is shorter than the length in the direction perpendicular the image forming elements arrangement direction so that a greater amount of light can be obtained through each opening. As the opening member, a non-transmitting member can be provided directly on a surface of each image forming element.

Also, in the above-described optical printing head, the beam spot diameter can be made smaller than the arrangement pitch of the image forming elements. In an information or image writing optical system, the beam spot diameter is increasingly desired to be made smaller so that an excellent quality image can be formed. As well known, in electrophotography, an image is formed by forming a latent image on a photoconductor with an optical beam spot, applying toner to the latent image to form a toner image, transferring the toner image to a transfer sheet, and fixing the toner image to a sheet by heat or pressure. The toner image becomes larger than the original image in the above processes of developing, transferring and fixing. Therefore, by making the beam spot diameter smaller than the pitch of the light emitting elements, the toner image can be formed close to the original image in size.

The above-described optical printing head can be also used as an exposure unit of an image forming apparatus to irradiate a light to form a latent image on a photoconductor.

Numerous additional modifications and variation are possible in light of the above description and teachings. Therefore, it is to be understood within the scope of the appended claims, the present invention may be practiced in ways other than as specifically described herein.

This document claims priority and contains subject matter related to Japanese Patent Application No. 11-040821 and NO. 11-055214 filed in the Japanese Patent Office on Feb. 19, 1999 and Mar. 3, 1999, respectively, the entire contents of which are hereby incorporated by reference.

What is claimed is:

1. An image forming elements array comprising:
   a plurality of image forming elements and roof prisms which are arranged along a line in an arrangement direction and formed integrated with each other into a single element and which forms an erected image in the direction with a same magnification;
   wherein, when a distance in an optical axis from an object plane to an incident surface of the image forming element is represented by L and a distance in the optical axis from the incident surface to an emerging surface of the image forming element is represented by T, a condition: $0.20<=T/L<=0.50$ is satisfied, said array thus being configured and adapted such that an optical transmission efficiency and an image forming performance of said array are enhanced versus those of an array in which said condition is not satisfied.

2. An image forming elements array according to claim 1, wherein, when the distance in an optical axis from an incident surface to an emerging surface is represented by T, and an arrangement pitch of the image forming elements is represented by P, a condition: $0.16<=P/T<=0.50$ is satisfied.

3. An image forming elements array according to claim 1, wherein the arrangement pitch P of the image forming elements is less than about 1 mm.

4. An image forming elements array according to claim 1, wherein the incident and emerging surfaces are non-spherical.

5. An optical printing head for forming an optical spot on a scanned surface, comprising:

an image forming array including a plurality of image forming elements and roof prisms which are arranged along a line in an arrangement direction and formed integrated with each other into a single element and which forms an erected image in the direction with a same magnification, wherein, when a distance in an optical axis from an object plane to an incident surface of the image forming element is represented by L and a distance in the optical axis from the incident surface to an emerging surface of the image forming element is represented by T, a condition: 0.20<=T/L<=0.50 is satisfied, said array thus being configured and adapted such that an optical transmission efficiency and an image forming performance of said array are enhanced versus those of an array in which said condition is not satisfied; and a light emitting elements array including a plurality of light emitting elements;

wherein, the image forming elements array forms a light flux from each of the plurality of light emitting elements into an optical spot on the scanned surface.

6. An image forming apparatus comprising:

a scanned surface; and an optical printing head for forming an optical spot on the scanned surface, the optical printing head including;

an image forming array including a plurality of image forming elements and roof prisms which are arranged along a line in an arrangement direction and formed integrated with each other into a single element and which forms an erected image in the direction with a same magnification, wherein, when a distance in an optical axis from an object plane to an incident surface of the image forming element is represented by L and a distance in the optical axis from the incident surface to an emerging surface of the image forming element is represented by T, a condition: 0.20<=T/L<=0.50 is satisfied, said array thus being configured and adapted such that an optical transmission efficiency and an image forming performance of said array are enhanced versus those of an array in which said condition is not satisfied; and a light emitting elements array including a plurality of light emitting elements, wherein, the image forming elements array forms a light flux from each of the plurality of light emitting elements into an optical spot on the scanned surface.

7. An image forming elements array comprising:

a plurality of equivalent image forming elements and roof prism elements which are arranged along a line in an arrangement direction and formed integrated with each other into a single element, each of the plurality of image forming elements including an incident surface positioned at an incident side, an emerging surface positioned at an emerging side, and each of the roof prism elements including a pair of reflective surfaces to guide a light flux from the incident surface to the emerging side;

wherein, the incident and emerging surfaces are respectively non-spherical and an arrangement pitch of the roof prism elements is shorter than 1 mm such that uniformity of a density of a half tone image produced by said array is enhanced versus that produced by an array which is not formed of elements having such a shape and pitch.

8. An image forming elements array according to claim 7, wherein, when H represents a lens height, R represents a paraxial radius of curvature, K represents a cone constant, and A, B, C, D represent fixed numbers, a non-spherical shape surface $X_{ASP}(H)$ satisfies a condition;

$X_{ASP}(H)=H^2/[R+R\{1-(1+K)(H/R)^2\}]+AH^4+BH^6+CH^8+DH^{10}$ . . . and a spherical shape $X_{ASP}(H)$ satisfies a condition; $X_{ASP}(H)=H^2/[R+R\{1-(H/R)^2\}]$, and when a deviation amount (H) of the non-spherical shape $X_{ASP}(H)$ from the spherical shape $X_{SPH}(H)$ is represented by; $(H)=X_{ASP}(H)-X_{SPH}(H)$, the non-spherical shape $X_{ASP}(H)$ is set such that the deviation amount (H) continuously decreases as the lens height H increases.

9. An image forming elements array according to claim 8, wherein the incident surface and the emerging surface have a substantially same non-spherical shape and each of the plurality of image forming elements generates an erected image having a common magnification in the arrangement direction.

10. An image forming elements array according to claim 9, wherein an angle defined by an incident light axis and an emerging light axis is greater than about 90 degrees.

11. An optical printing head for forming an optical spot on a scanned surface, comprising:

an image forming elements array including a plurality of equivalent image forming elements and roof prism elements which are arranged along a line in an arrangement direction and formed integrated with each other into a single element, each of the plurality of image forming elements including an incident surface positioned at an incident side, an emerging surface positioned at an emerging side and each of the roof prism elements including a pair of reflective surfaces to guide a light flux from the incident surface to the emerging side, the incident and emerging surfaces being respectively non-spherical, and an arrangement pitch of the roof prism elements being shorter than 1 mm such that uniformity of a density of a half tone image produced by said array is enhanced versus that produced by an array which is not formed of elements having such a shape and pitch; and a light emitting elements array including a plurality of light emitting elements, wherein, a light flux from each of the plurality of light emitting elements of the light emitting elements array forms the optical spot on the scanned surface via at least two image forming elements of the plurality of image forming elements.

12. An optical printing head according to claim 11, further comprising:

an opening member having a plurality of openings, that is arranged at least in one of a position between the light emitting elements array and the image forming elements array and a position between the image forming elements array and the scanned surface such that the plurality of openings of the opening member respectively correspond to the image forming elements of the image forming elements array.

13. An optical printing head according to claim 12, wherein a beam spot diameter is smaller than an arrangement pitch of the light emitting elements.

14. An image forming apparatus comprising:

a scanned surface; and an optical printing head for forming an optical spot on the scanned surface, the optical printing head including;

an image forming elements array including a plurality of equivalent image forming elements and roof prism elements which are arranged along a line in an arrangement direction and formed integrated with each other into a single element, each of the plurality of image forming elements including an incident surface positioned at an incident side, an emerging surface positioned at an emerging side and each of the roof prism elements including a pair of reflective surfaces to guide a light flux from the incident surface to the emerging side, the incident and emerging surfaces being respectively non-spherical, and an arrangement pitch of the roof prism elements being shorter than 1 mm such that uniformity of a density of a half tone image produced by said array is enhanced versus that produced by an array which is not formed of elements having such a shape and pitch; and a light emitting elements array including a plurality of light emitting elements, wherein a light flux from each of the plurality of light emitting elements of the light emitting elements array forms the optical spot on the scanned surface via at least two image forming elements of the plurality of image forming elements.

* * * * *

UNITED STATES PATENT AND TRADEMARK OFFICE
CERTIFICATE OF CORRECTION

PATENT NO.   : 6,496,214 B1
DATED        : December 17, 2002
INVENTOR(S)  : Masuda et al.

It is certified that error appears in the above-identified patent and that said Letters Patent is hereby corrected as shown below:

<u>Title page,</u>
Item [73], Assignee, the name and address of the Assignee should read
-- Ricoh Company, Ltd., Tokyo (JP) --

Signed and Sealed this

Twenty-fifth Day of March, 2003

JAMES E. ROGAN
*Director of the United States Patent and Trademark Office*